United States Patent [19]

Arzounian et al.

[11] Patent Number: 4,974,258
[45] Date of Patent: Nov. 27, 1990

[54] VANDAL-PROOF HANDSET FOR A PAY TELEPHONE

[75] Inventors: Raymond D. Arzounian; Raymond Arzounian, both of Philadelphia, Pa.

[73] Assignee: Raytel, Inc., Philadelphia, Pa.

[21] Appl. No.: 383,946

[22] Filed: Jul. 21, 1989

[51] Int. Cl.⁵ .......................................... H04M 17/02
[52] U.S. Cl. .................................. 379/145; 379/433; 379/437
[58] Field of Search ................ 379/145, 155, 433, 437

[56] References Cited

U.S. PATENT DOCUMENTS

| | | |
|---|---|---|
| 2,453,192 | 11/1948 | Bryant . |
| 3,238,313 | 3/1966 | Kalogris . |
| 4,038,502 | 7/1977 | Ambruoso, Sr. et al. . |
| 4,436,967 | 3/1984 | Cohen . |
| 4,490,586 | 12/1984 | Oliver . |
| 4,518,826 | 5/1985 | Caudill et al. . |
| 4,518,830 | 5/1985 | Drexler et al. . |
| 4,862,494 | 8/1989 | Matheny .............................. 379/145 |

FOREIGN PATENT DOCUMENTS

| | | |
|---|---|---|
| 2823668 | 12/1979 | Fed. Rep. of Germany . |
| 2941485 | 4/1981 | Fed. Rep. of Germany . |
| 2477812 | 9/1981 | France . |
| 2556155 | 6/1985 | France . |
| 2064265 | 6/1981 | United Kingdom . |

Primary Examiner—Stafford D. Schreyer
Attorney, Agent, or Firm—Panitch Schwarze Jacobs & Nadel

[57] ABSTRACT

A vandal-proof handset for a pay telephone having apertures therein for allowing sound to pass therethrough. The handset includes a transducer for converting either sound to electrical signals or electrical signals to sound. The transducer is positioned within the handset proximate the apertures such that the sound is transmitted or received by the transducer through the apertures. A disk member for preventing access to the transducer through the aperture includes openings therein for allowing sound to pass therethrough. The disk member is positioned between the handset apertures and the transducer such that the openings in the disk member and the apertures in the handset are not in registry. The transducer, therefore, is not accessible through the disk member openings.

12 Claims, 2 Drawing Sheets

VANDAL-PROOF HANDSET FOR A PAY TELEPHONE

FIELD OF THE INVENTION

The present invention relates to a handset for a telephone and, more particularly, to a vandal-proof handset for a pay telephone.

BACKGROUND OF THE INVENTION

Conductive wire may be used by vandals to make illicit calls from pay telephones. One end of the wire is inserted through the perforated transmitter cap of the handset, at the central aperture, to puncture the transmitter cover and contact the carbon granules inside. The other end of the wire is inserted in one of the apertures in the receiver cap to contact the metal cover on the receiver, thereby enabling the vandal to make a "free" telephone call. Consequently, a need has arisen for preventing such use of a conductive wire.

Vandal-proof handsets are known, but they fall short of meeting the above-mentioned need. For instance, one type of vandal-proof handset prevents the transducer or receiver cap from being removed from the handset. This is accomplished by providing a protective cover piece having a large central aperture in each transducer or receiver socket. The cover includes axial slots which engage axial ribs on the socket wall to prevent rotation of the cover. A coil spring urges the cover into engagement with the transducer or receiver cap. The cover includes circumferential sawteeth located on its upper surface which cooperate with flexible radial ribs on the cap to allow rotation of each cap when screwed on, but to prevent each cap from being unscrewed.

Other public telephone systems avoid the above-mentioned problem by not using a conventional handset. For example, German Patent Application No. DE 29 41 485 A1, a microphone and loud speaker may be recessed within the telephone housing. Typically, the microphone and loud speaker are positioned within the housing behind a screen or heavy grid. This type of system is problematic in that there is no sense of privacy, anybody in the immediate area surrounding the telephone can hear the user's conversation.

The present invention provides a vandal-proof handset which prevents access to the transducers thereof. An apertured disk is positioned between the transducer and end cap such that the apertures within the disk and the apertures in the end cap are not in registry. Therefore, the transducer is not accessible through any of the apertures in the cap.

SUMMARY OF THE INVENTION

Briefly stated, the present invention is a vandal-proof handset for a pay telephone. A handset is provided with one or more apertures therein for allowing sound to pass therethrough. A transducer for converting either sound to electrical signals or electrical signals to sound is positioned within the handset proximate the apertures such that sound is transmitted or received by the transducer through the apertures. A disk member for preventing access to the transducer through the apertures, includes one or more openings therein for allowing sound to pass therethrough. The disk member is interposed between the handset apertures and the transducer such that the openings in the disk member and the apertures in the handset are not in registry, thereby forming an imperforate wall. Consequently, the transducer is not accessible through the disk member openings.

BRIEF DESCRIPTION OF THE DRAWINGS

The foregoing summary, as well as the following detailed description of the preferred embodiment, will be better understood when read in conjunction with the appended drawings. For the purpose of illustrating the invention, there is shown in the drawings an embodiment which is presently preferred, it being understood, however, that the invention is not limited to the specific methods and instrumentalities disclosed. In the drawings.

DESCRIPTION OF THE PREFERRED EMBODIMENT

Figures 1, 2:
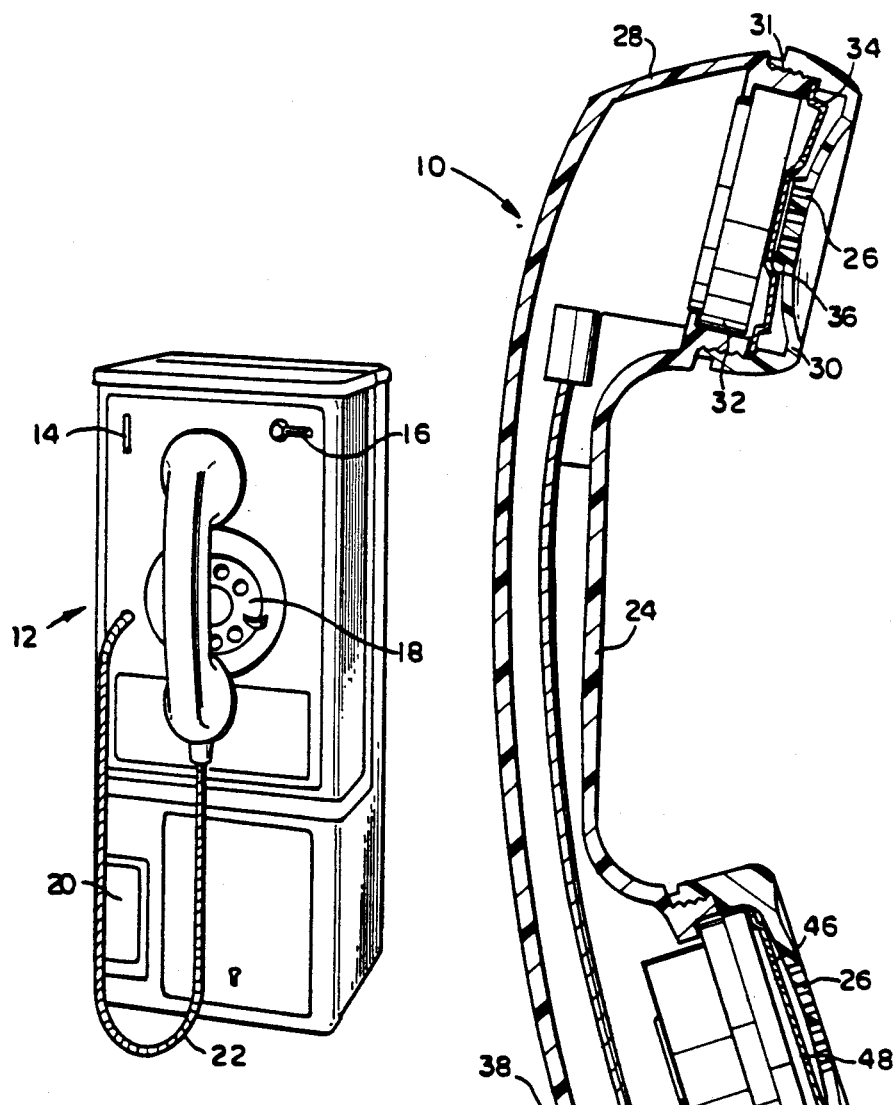
FIG. 1 is a perspective view of a pay telephone including a vandal-proof handset in accordance with the present invention.
FIG. 2 is an enlarged partial sectional view of the vandal-proof handset of FIG. 1.

Certain terminology is used in the following description for convenience only and is not limiting. The words "right," "left," "lower" and "upper" designate directions in the drawings to which reference is made. The words "inwardly" and "outwardly" refer to directions toward and away from, respectively, the geometric center of the vandal-proof handset and designated parts thereof. The terminology includes the words above specifically mentioned, derivatives thereof and words of similar import.

Figure 3:
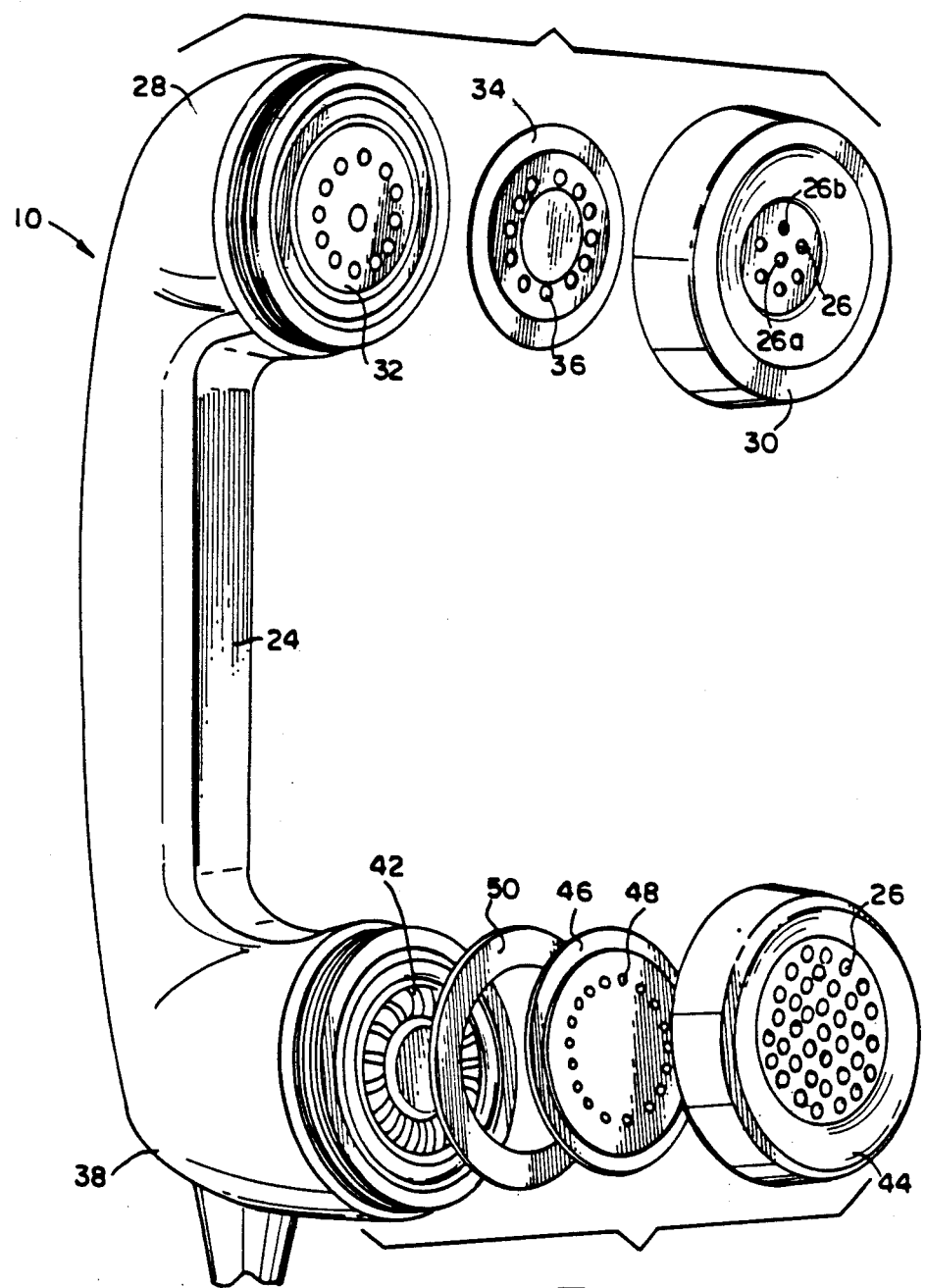
FIG. 3 is an exploded perspective view of the vandal-proof handset of FIG. 1.

Referring to the drawings, wherein like numerals indicate like elements throughout, there is shown in FIGS. 1 through 3 a first preferred embodiment of a vandal-proof handset in accordance with the present invention designated generally as 10. Vandal-proof handset 10 is electrically and mechanically connected to a conventional public pay telephone 12. The pay telephone 12 includes, inter alia, a coin slot 14, coin return knob 16, rotary dial 18, and coin return bucket 20. An armored cord 22 electro-mechanically connects the vandal-proof handset 10 to the pay telephone 12.

The specifics of the pay telephone 12 are not pertinent to the present invention. It is understood by those skilled in the art that the vandal-proof handset can be used in connection with any type of suitable pay telephone, such as a coin or credit card operated pushbutton type, without departing from the spirit and scope of the invention.

Referring now to FIGS. 2 and 3, the handset 10 includes a yoke portion 24 which can be grasped by the hand of a user. Each cap of the handset 10 is provided with apertures 26 for allowing sound to pass therethrough.

In the present embodiment, it is preferred that the handset 10 be of the conventional threadably secured cap type (FIG. 3) familiar to those skilled in the art. However, as is understood by those skilled in the art, the present invention is equally applicable to other types of handsets such as the two piece handset disclosed in U.S. Pat. No. 4,518,830. Furthermore, the invention is equally applicable to a pay telephone wherein the transmitter is incorporated within the telephone housing and the receiver is incorporated within an earpiece connected to the housing via an armored cord.

As shown in FIG. 3, the handset 10 includes a receiver portion 28 connected to one end of the yoke portion 24. In the present embodiment, it is preferred that the receiver portion 28 include a receiver end cap 30 threadably secured thereto via suitable complementary threads 31. A transducer or receiver 32 for converting electrical signals into sound is located in conventional manner in receiver portion 28.

The receiver end cap 30 has apertures 26 therein for allowing sound from the transducer or receiver 32 to pass therethrough. It is preferred that the apertures 26 be of generally circular cross section. However, it is understood by those skilled in the art that the apertures 26 can be geometrically configured in any suitable shape, such as square or elliptical. The transducer or receiver 32 is positioned within the receiver portion 28 proximate the apertures 26 such that sound is transmitted by the transducer or receiver 32 through the apertures 26.

In the present embodiment, it is preferred that the apertures 26 be located on the receiver end cap 30 in a predetermined pattern. For instance, as shown in FIG. 3, the receiver and cap 30 includes a centrally disposed aperture 26a and an annular array of apertures 26b concentrically positioned about the centrally disposed aperture 26a. However, it is understood by those skilled in the art that the apertures 26 can be disposed on the receiver end cap in any suitable geometric configuration, such as square or rectangular.

As shown in FIG. 3, a disk member or receiver disk 34 is provided for preventing access to the receiver 32 through the apertures 26 in receiver end cap 30. The receiver disk 34 includes openings 36 therein for allowing sound to pass therethrough. The openings 36 are generally circular shaped in cross section. The openings 36 are annularly positioned around the center of the receiver disk 34 at a predetermined radial distance therefrom.

In the present embodiment, it is preferred that the receiver disk 34 be generally circular shaped and constructed of a sheet of metallic material, such as spring steel. Preferably, the receiver disk 34 has a thickness substantially equal to 15 mils. However, it is understood by those skilled in the art that the receiver disk 34 can be constructed of other materials and/or shaped in different geometric configurations and thickness, respectively, without departing from the spirit and scope of the invention.

As shown in FIG. 2, the receiver disk 34 is interposed between the receiver end cap 30 and the receiver 32 such that the apertures 26 in the receiver end cap 30 and the openings 36 in the receiver disk 34 are not in registry. Consequently, the receiver 32 is not accessible through the apertures 26 in the receiver end cap 30, thereby preventing vandalism. That is, an effectively imperforate wall is formed in front of the receiver 32 which, while allowing sound to pass therethrough, prevents access to the receiver with a conductive wire.

In the present embodiment, it is preferred that the openings 36 in the receiver disk 34 be positioned about the receiver disk 34 in an annular fashion, as shown in FIG. 3. However, it is understood by those skilled in the art that the openings 36 can be positioned on the receiver disk 34 in any pattern, so long as the openings 36 are not in registry with the apertures 26 when the receiver disk 34 is interposed between the receiver end cap 30 and receiver 32.

As shown in FIG. 3, a transmitter portion 38 is connected to the other end of the yoke portion 24. A transducer or transmitter 42 for converting sound to electrical signals is located in the transmitter portion. A transmitter end cap 44, having apertures 26 therein for allowing sound to pass therethrough to the transmitter, is threadably connected to the transmitter portion.

A disk member or transmitter disk 46 for preventing access to the transmitter 42 through the apertures 26 in transmitter end cap 44 includes openings 48 therein for allowing sound to pass therethrough. The transmitter disk 46 is interposed between the transmitter end cap 44 and the transmitter 42 such that the apertures 26 in the transmitter end cap 44 and the openings 48 in the transmitter disk 46 are not in registry. Consequently, the transmitter 42 is not accessible through the apertures 26 in the transmitter end cap 44.

If the transmitter disk 46 is constructed of an electrically conductive material, it is preferred that an annular gasket 50 constructed of a non-electrically conductive material be inserted between the transmitter disk 46 and the transmitter 42, as shown in FIG. 3. This electrically isolates the transmitter disk 46 from the transmitter 42, which is necessary in certain telephones since mere contact with the transmitter 42 and not total puncture enables vandals to make a free telephone call.

In the present embodiment, it is preferred that the gasket 50 be constructed of rubber. However, it is understood by those skilled in the art that the gasket 50 could be constructed of other non-electrically conductive materials, such as a polymeric material. It is also understood by those skilled in the art that the gasket 50 could be similarly interposed between the receiver disk 34 and receiver 32.

From the foregoing description, it can be seen that the present invention comprises a vandal-proof handset for a pay telephone. It is recognized by those skilled in the art that changes may be made to the above-described embodiment of the invention without departing from the broad inventive concept thereof. It is understood, therefore, that this invention is not limited to the particular embodiment disclosed, but is intended to cover all modifications which are within the spirit and scope of the invention as defined by the appended claims.

We claim:

1. A vandal-proof handset for a pay phone, comprising:

a handset having a portion provided with one or more apertures therein for allowing sound to pass therethrough;

a transducer for converting either sound to electrical signals or electrical signals to sound, said transducer being positioned within said handset portion proximate said one or more apertures such that sound is transmitted or received by said transducer through said one or more apertures; and a disk member for preventing access to said transducer through said one or more apertures, said disk member including one or more openings therein for allowing sound to pass therethrough, said disk member being positioned completely within said handset portion and interposed between said one or more handset apertures and said transducer such that said one or more openings in said disk member and said one or more apertures in said handset are not in registry, whereby said handset is vandal-proof because said transducer is not accessible through said one or more disk member openings.

2. The vandal-proof handset as recited in claim 1 wherein said transducer is a receiver.

3. The vandal-proof handset as recited in claim 1 wherein said transducer is a transmitter.

4. The vandal-proof handset as recited in claim 1 wherein said disk member is substantially 15 mil thick.

5. The vandal-proof handset as recited in claim 1 wherein said disk member is constructed of spring steel.

6. The vandal-proof handset as recited in claim 1 wherein said disk member is generally circular shaped and is constructed of a sheet of metallic material.

7. The vandal-proof handset as recited in claim 6 further including a generally annular gasket constructed of a non-electrically conductive material interposed between said disk member and said transducer for electrically isolating the disk member from the transducer.

8. A vandal-proof handset for a pay phone, comprising:
- a handset including a yoke portion which can be grasped by a hand of a user;
- a receiver portion connected to one end of said yoke portion, said receiver portion including a receiver therein for converting electrical signals into sound, said receiver portion including one or more apertures therein for allowing sound from said receiver to pass therethrough;
- a receiver disk for preventing access to said receiver through said one or more receiver portion apertures, said receiver disk including one or more openings therein for allowing sound to pass therethrough, said receiver disk being positioned completely within said receiver portion and interposed between said one or more receiver portion apertures and said receiver such that said one or more receiver portion apertures and said one or more receiver disk openings are not in registry, whereby said receiver is not accessible through said one or more receiver portion apertures;
- a transmitter portion connected to an other end of said yoke portion, said transmitter portion including a transmitter therein for converting sound to electric signals, said transmitter portion including one or more apertures therein for allowing sound to pass therethrough to said transmitter; and
- a transmitter disk for preventing access to said transmitter through said one or more transmitter portion apertures, said transmitter disk including one or more openings therein for allowing sound to pass therethrough, said transmitter disk being positioned completely within said transmitter portion and interposed between said transmitter portion and said transmitter such that said one or more transmitter portion apertures and said one or more transmitter disk openings are not in registry whereby said handset is vandal-proof because said transmitter is not accessible through said one or more transmitter portion apertures.

9. The vandal-proof handset as recited in claim 8 wherein each of said transmitter and receiver disks is substantially 15 mil thick.

10. The vandal-proof handset as recited in claim 8 wherein each of said transmitter and receiver disks is constructed of spring steel.

11. The vandal-proof handset as recited in claim 8 wherein each of said receiver and transmitter disks are generally circular shaped and are constructed of a sheet of metallic material.

12. The vandal-proof handset as recited in claim 11 further including a generally annular gasket constructed of a non-electrically conductive material interposed between said disk member and said transducer for electrically isolating the disk member from the transducer.

* * * * *